(12) United States Patent
Zhang et al.

(10) Patent No.: US 7,630,320 B2
(45) Date of Patent: Dec. 8, 2009

(54) PACKET SCHEDULING METHOD FOR WIRELESS COMMUNICATION SYSTEM

(75) Inventors: Junfeng Zhang, Shenzhen (CN); Jiewei Ding, Shenzhen (CN); Yi Sun, Shenzhen (CN); Jun Zhang, Shenzhen (CN); Yingchun Pu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 606 days.

(21) Appl. No.: 10/579,131

(22) PCT Filed: Nov. 14, 2003

(86) PCT No.: PCT/CN03/00966

§ 371 (c)(1), (2), (4) Date: May 12, 2006

(87) PCT Pub. No.: WO2005/048614

PCT Pub. Date: May 26, 2005

(65) Prior Publication Data

US 2007/0116024 A1 May 24, 2007

(51) Int. Cl.
*H04L 12/26* (2006.01)
*H04L 12/28* (2006.01)
*H04L 12/56* (2006.01)

(52) U.S. Cl. .................. 370/252; 370/230; 370/249; 370/395.42; 370/412

(58) Field of Classification Search .............. 370/235
See application file for complete search history.

(56) References Cited

U.S. PATENT DOCUMENTS 5,121,383 A * 6/1992 Golestani .................. 370/235
5,883,819 A * 3/1999 Abu-Amara et al. ........... 716/1
6,028,842 A * 2/2000 Chapman et al. ............ 370/235
6,115,390 A * 9/2000 Chuah ...................... 370/443
6,618,397 B1 * 9/2003 Huang ...................... 370/474

(Continued)

FOREIGN PATENT DOCUMENTS

| CA | 2361707 | 8/2000 |
|----|---------|--------|
| JP | 2001285352 | 10/2001 |

*Primary Examiner*—Alpus H Hsu
*Assistant Examiner*—Jessica Clifton
(74) *Attorney, Agent, or Firm*—Thomas, Kayden, Horstemeyer & Risley, LLP (57) ABSTRACT

The present invention provides a method of scheduling packet in a wireless telecommunication system, in which the user packet queues to be transmitted are divided into the user packet queues with packet loss and the user packet queues without packet loss; for the user packet queues with packet loss, if a real time loss ratio of packet for the user exceeds a predetermined loss ratio threshold of packet, terminate a connection to the user; if the real time loss ratio of packet for the user does not exceed the predetermined loss ratio threshold of packet, schedule the user packet queues according to a volume of the loss ratio of packet; for the user packet queues without packet loss, schedule according to packet lengths, channel quality states, time delays and time delay jitters. The present invention decreases the packet loss ratio by giving priority to scheduling users with high packet loss ratio under the condition of existing a certain extent of packet loss, takes the requirements of user packet service sensitive to the time delay jitter into full consideration, and controls the time delay jitter to maintain invariable, therefore improves the telecommunication quality of those users.

26 Claims, 3 Drawing Sheets

U.S. PATENT DOCUMENTS

| | | | |
|---|---|---|---|
| 7,260,060 B1 * | 8/2007 | Abaye et al. | 370/230 |
| 7,336,611 B1 * | 2/2008 | Aweya et al. | 370/235 |
| 2001/0007561 A1 * | 7/2001 | Aznar et al. | 370/409 |
| 2001/0008542 A1 * | 7/2001 | Wiebke et al. | 375/141 |
| 2001/0033581 A1 * | 10/2001 | Kawarai et al. | 370/468 |
| 2001/0051992 A1 * | 12/2001 | Yang et al. | 709/207 |
| 2002/0023165 A1 * | 2/2002 | Lahr | 709/231 |
| 2002/0044527 A1 * | 4/2002 | Jiang et al. | 370/229 |
| 2002/0057699 A1 * | 5/2002 | Roberts | 370/395.32 |
| 2002/0114340 A1 * | 8/2002 | Kumazawa et al. | 370/412 |
| 2003/0039213 A1 | 2/2003 | Holtzman et al. | |
| 2003/0039217 A1 * | 2/2003 | Seo et al. | 370/318 |
| 2003/0112802 A1 * | 6/2003 | Ono et al. | 370/389 |
| 2003/0198204 A1 * | 10/2003 | Taneja et al. | 370/332 |
| 2004/0042470 A1 * | 3/2004 | Cooper et al. | 370/401 |
| 2004/0059827 A1 * | 3/2004 | Chiang et al. | 709/235 |
| 2004/0156354 A1 * | 8/2004 | Wang et al. | 370/352 |
| 2004/0177087 A1 * | 9/2004 | Wu et al. | 707/102 |
| 2004/0218617 A1 * | 11/2004 | Sagfors | 370/412 |
| 2004/0233845 A1 * | 11/2004 | Jeong et al. | 370/230 |
| 2005/0047425 A1 * | 3/2005 | Liu et al. | 370/411 |
| 2006/0039280 A1 * | 2/2006 | Anandakumar et al. | 370/229 |

\* cited by examiner

PACKET SCHEDULING METHOD FOR WIRELESS COMMUNICATION SYSTEM

CROSS-REFERENCE TO RELATED APPLICATIONS

This application is a national stage application of International Application No. PCT/CN2003/000966, filed Nov. 14, 2003, which is hereby incorporated by reference in its entirety into the present application.

TECHNICAL FIELD OF THE INVENTION

The present invention relates to the wideband code division multiple access (WCDMA) communication system in the field of wireless telecommunication, specifically, relates to a method for scheduling packet in a WCDMA communication system.

BACKGROUND OF THE INVENTION

Wideband code division multiple access is a scheme of wireless transmission technique proposed by the third generation mobile telecommunication system standard organization. The well-known time division multiple access (TDMA) and frequency division multiple access (FDMA) techniques are mainly used for transmitting voice and data with low rate, so they have certain limitations. The code division multiple access (CDMA) modulation technique is a new kind of telecommunication techniques used in the situation when there are a large number of system users.

The third generation telecommunication system can provide mobile users with multi-media service similar to that of the fixed network, and supports worldwide roam with good service quality. Its biggest character is that it supports wireless services with high transmission rate, such as surfing and browsing internet in wireless condition, downloading, video with high quality, audio stream service, FTP service, visible telephone and e-mail. In the third generation partnership project (3GPP) standard protocol, the R99 version can support air transmission rate as high as 2 Mbps, in the enhanced R5 version, the high speed downlink packet access HSDPA system employs the adaptive modulation code AMC and the hybrid automatic repeat request technique HARQ, so that the third generation mobile telecommunication system can support packet service with the air transmission rate as high as 12 Mbps. Because the packet service to be transmitted has very high rate, the ways of properly scheduling the packets to the air link for transmitting is an important factor in influencing the final transmission efficiency. The indexes for evaluating the packet scheduling algorithm mainly are the peak transmission rate, the extent to which the service quality QoS is met, and the fairness level of treating the packets of respective users.

In wire data telecommunication network, there has already been the technique of packet scheduling, the purpose of which is mainly to improve the transmission efficiency of network, for example, US patent application 20030103453 "System and method for managing flow bandwidth utilization in a packet communication environment" proposed a Time-Division-Queue Rate Control Scheme (TDQ-RCS) to resolve the problem of packet scheduling in wire data telecommunication. However, since in the wire telecommunication system, the analysis on packet scheduling, generally speaking, is based on two kinds of channel states, which are the availability of channel and the non-availability of channel, rather than the channel quality, while there may be many kinds of channel states in the wireless telecommunication system, this invention can not solve the problem of packet scheduling in wireless telecommunication system. The scheduling method used in wireless telecommunication is much more complicated than that in wire data telecommunication.

In order to meet the need of packet scheduling in wireless telecommunication, it is necessary to add the influence of channel condition on scheduling to the original packet scheduling method in wire data telecommunication. For example, US patent application 20020044527 "Channel efficiency based packet scheduling for interactive data in cellular networks" proposed a packet scheduling method used in GPRS system, which considered the influence of channel efficiency parameter on packet scheduling weight in connection with the commonly used weighted fair queuing (WFQ) scheduling method. The channel efficiency is the reciprocal of the maximum transmission rate permitted in the wireless condition, which represents the channel quality corresponding to each user, the better the channel quality is, the more the resource assigned to the packet is. This method is very efficient for the packet service without time delay sensitivity, but as for packet service sensitive to transmission time delay, it can not meet the requirements of service quality QoS. Because this method takes channel quality as the chief judging principle, the packet service with good channel quality takes less time in waiting for transmitting than the packet service with poor channel quality does. Therefore, the transmission of the service sensitive to the transmission time delay will be delayed due to its poor channel quality, and its QoS requirements will not be met.

There are also corresponding solving methods related to the specific packet services with time delay sensitivity. For example, US patent application 20030101274 "packet transmission scheduling technique" described a method for scheduling the real time packet service in WCDMA high speed downlink packet access HSDPA system, which judges the weight of packet by the maximum time delay threshold determined by the priority, quantity, time delay and service quality QoS of the packet on the basis of states of the wireless channel. The closer the time delay of data approximates to the maximum time delay threshold, or when the time delay is long enough, the higher transmission priority the data has. However, as for the real time packet service whose data delay exceed the maximum time delay threshold, its corresponding data packet will be discarded. The discarding of packet is unavoidable, and with the existing technique, the loss ratio of packet can not be further decreased, and there is no related solution provided for the users losing packet. As a result, the loss ratio of packet of the users in bad transmission condition remains high, and the communication quality and satisfaction of users may be influenced; Compared with wire transmission, the packet loss in wireless transmission often occurs in burst, so special measures are needed to deal with the packet loss.

The above methods only consider some of the characters of wireless telecommunication while neglect some others. For example, some of the real time packet services, such as the packet audio and video service, are quite sensitive to time delay jitter, which will greatly affect the quality of telecommunication. The common solution to this problem is to set data buffer with enough length to compensate the shortcomings of time delay jitter, as in US paten application 20030112796 "Voice and data exchange over a packet based network with fax relay spoofing" and US patent application 20030026275 "Dynamic Jitter buffering for voice-over-IP and other packet-based communication systems". However, in order to control the big time delay jitter, big data buffer has to be set, which will result in the increasing transmission time delay of the date, which when exceeds a certain limitation, the requirement of service quality of wireless telecommunication can not be met. The existing technique does not consider the treatment toward the time delay jitter in packet scheduling under the condition of meeting all the requirements of service quality QoS, therefore the communication quality of some services is destroyed.

SUMMARY OF THE INVENTION

The technical problem to be solved in the present invention is to provide a method for scheduling packet in a wireless telecommunication system, for the purposes of decreasing the loss ratio of packet and controlling the time delay jitter, therefore optimizing the packet time delay, throughput, time delay jitter and loss ratio of packet under the condition of meeting the QoS requirements of all services.

The method for scheduling packet in wireless telecommunication system described in the present invention divides the user packet queues to be transmitted into the user packet queues with packet loss and user packet queues without packet loss; for the user packet queues with packet loss, if a real time loss ratio of packet for the user exceeds a predetermined loss ratio threshold of packet, terminates a connection to the user; if the real time loss ratio of packet for the user does not exceed the predetermined loss ratio threshold of packet, schedules the user packet queues according to a volume of the loss ratio of packet; for the user packet queues without packet loss, schedules according to packet lengths, channel quality states, time delays and time delay jitters.

The present invention, through giving priority to scheduling the users with high loss ratio of packet under the condition of existing a certain range of packet loss, decreases the loss ratio of packet, especially those whose users are in bad transmission condition, thereby ensures the comparative fairness of transmission in unfair transmission conditions. When the loss ratio of packet exceeds the threshold, the connections to the users will be terminated temporarily waiting for the improvement of transmission condition. The present invention takes the requirements of packet service for users sensitive to the time delay jitter into full consideration, it controls the time delay jitter to maintain invariable, therefore improves the telecommunication quality of those users.

DETAILED DESCRIPTION OF PREFERRED EMBODIMENT

Next, the technical scheme of the present invention will be further described in detail in connection with appended drawings and embodiments.

The core theory of the present invention is that: first, the user packet queues to be transmitted are divided into the user packet queues with packet loss and the user packet queues without packet loss; for the user packet queues with packet loss, if a real time loss ratio of packet for the user exceeds a predetermined loss ratio threshold of packet, terminates a connection to the user; if the real time loss ratio of packet for the user does not exceed the predetermined loss ratio threshold of packet, schedules the user packet queues according to a volume of the loss ratio of packet; for the user packet queues without packet loss, schedules according to packet lengths, channel quality states, time delays and time delay jitters.

Figure 1:
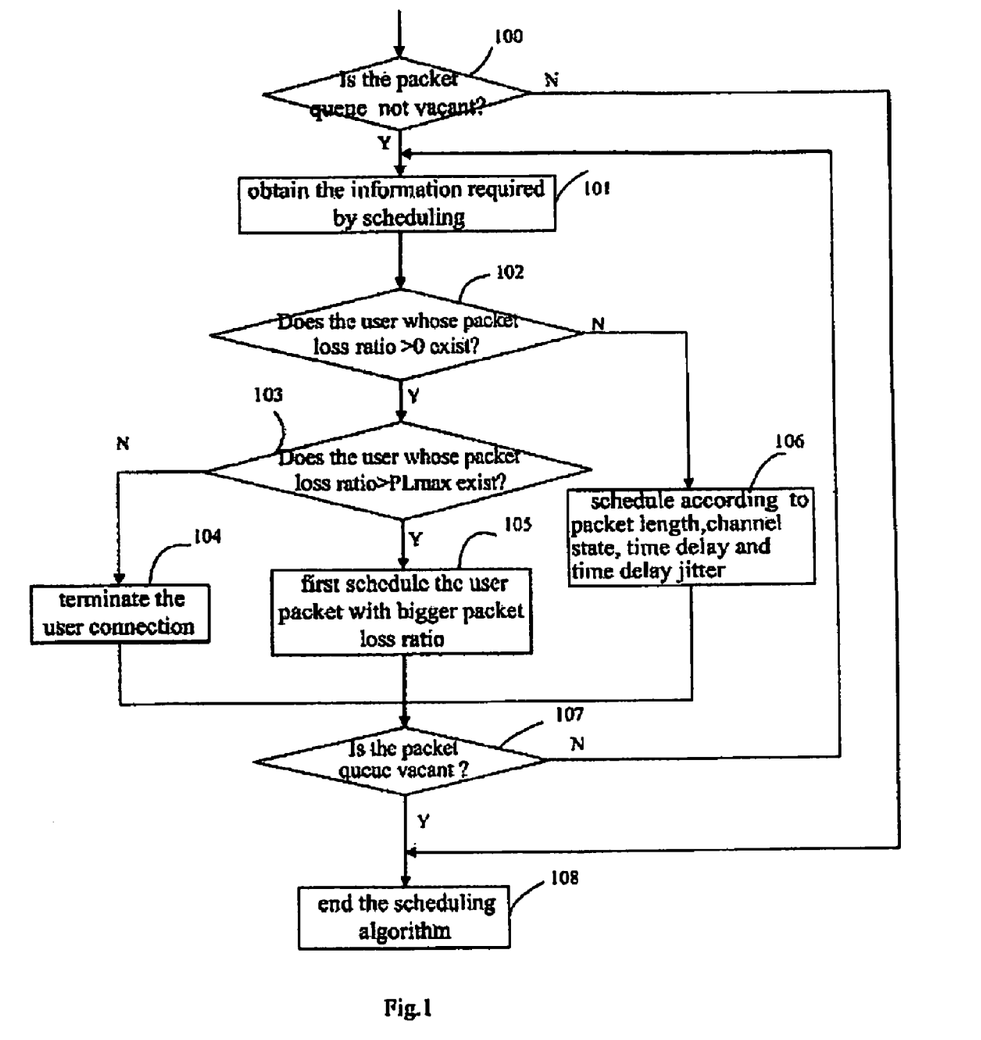
FIG. 1 is the flowchart of the packet scheduling method according to the present invention.

As shown in the flowchart of FIG. 1, first, judge whether the packet queue to be transmitted is vacant or not (step 100), if yes, perform step 108 to exit the scheduling algorithm, if not, obtain the related information required by the scheduling at the beginning of each scheduling period (step 101), the information includes the channel quality states, the length of all the packets to be transmitted, the maximum delay threshold of various services, the delay waiting time of each packet, the real time loss ratio of packet of each user, the real time loss ratio threshold of packet of each user, the time delay jitter of packet, the time delay jitter threshold of packet.

In the above information, the channel quality state is the reciprocal of the maximum transmission rate possible for the wireless channel, and is referred as $C_{i,j}$, wherein, i represents one user index, j represents the scheduling period, and its value is an integer not less than one. The channel quality state $C_{i,j}$ can also be represented in other ways, for example, represented as the reciprocal of S/N of channel or the path loss of transmission.

All the length of the packets to be transmitted is referred as $l_{i,j}$, wherein, i represents one user index, j represents the scheduling period, the value of j is an integer not less than one.

The maximum delay threshold of various services is referred as $W_{max,m}$, m corresponds to the type of services with limitation of maximum delay threshold. The delay waiting time of each packet is referred as $W_{i,j}$, wherein, i represents one user index, j represents the scheduling period, the value of j is an integer not less than one.

The real time loss ratio of packet of various users is referred as $PL_{i,j}$, wherein i represents one user index, j represents the scheduling period, the value of j is an integer not less than one. The real time loss ratio of packet $PL_{i,j}$ can be represented by the proportion of packets loss to all of the transmitted packets in a certain period of time, the concrete length of time depends on the statistic period of the whole system, which can usually be selected between 200 ms and 2s, with 200 ms is preferable, because the shorter the time is, the faster the response of system is, but since the consumption of system resource will be increased, an overall consideration is necessary. The real time loss ratio threshold of packet of each user is referred as $PL_{max}$, and $PL_{max} > 0$.

The packet time delay jitter is referred as $Jitter_{i,j}$, wherein i represents one user index, j represents the scheduling period, the value of j is an integer not less than one. The time delay jitter $Jitter_{i,j}$ can be represented in recursion:

$Jitter_{i,j} = 0$, when j=1, $Jitter_{i,j} = \alpha |(W_{i,j} + l_{i,j} C_{i,j}) - (W_{i,j-1} + l_{i,j-1} C_{i,j-1})| + (1-\alpha) Jitter_{i,j-1}$, when $j \in [2, +\infty)$, Wherein $\alpha \in (0,1)$. The time delay jitter $Jitter_{i,j}$ can also be represented in other forms, for example, the recursion of time delay jitter can be defined as $Jitter_{i,j} = \alpha |(W_{i,j}) - (W_{i,j-1})| + (1-\alpha) Jitter_{i,j-1}$. The maximum time delay jitter threshold of packet can be represented as $Jitter_{max,n}$, wherein n corresponds to the type of services with limitation of maximum time delay jitter threshold.

After obtaining the above related information, judge whether there are users whose real time loss ratio of packet $PL_{i,j}$ is more than 0 (step 102), if yes, judge whether there are users whose real time loss ratio of packet $PL_{i,j}$ exceeds the real time loss ratio threshold of packet $PL_{max}$ (step 103), for whom, the connection will be terminated, and step 107 will be performed to judge whether the packet queue is vacant; if there is no user whose real time loss ratio of packet $PL_{i,j}$ exceeds the real time loss ratio threshold of packet $PL_{max}$, that is, when $PL_{max} \geq PL_{i,j} > 0$, schedule the user packet according to the volume of loss ratio of user packet, that is, give priority to scheduling the user packet with big packet loss ratio, till all the user packets less than the real time loss ratio threshold of packet $PL_{max}$ are scheduled, then perform step 107 to judge whether the packet queue is vacant.

If there is no user whose real time packet loss ratio $P_{i,j}$ is more than 0, perform step 106, that is consider the packet length $l_{i,j}$, channel state $C_{i,j}$, time delay $W_{i,j}$, time delay jitter $Jitter_{i,j}$ etc. comprehensively to schedule the packets in the queue, scheduling with priority can be performed according to the principal of least $(W_{max,m}-W_{i,j})(Jitter_{max,n}-Jitter_{i,j})l_{i,j}C_{i,j}$, wherein $(W_{max,m}-W_{i,j})$ represents the limitation to time delay, $(Jitter_{max,n}-Jitter_{i,j})$ represents the limitation to the time delay jitter, $l_{i,j}$ represents the consideration over the packet length, $C_{i,j}$ represents the consideration over the channel state; The principal of least $(Jitter_{max,n}-Jitter_{i,j})l_{i,j}C_{i,j}/W_{i,j}$ can also be employed for scheduling. After finishing the scheduling, judge whether the packet queue is vacant (step 107).

If the packet queue is vacant, end the scheduling (step 108); if not, turn to step 101 to perform the scheduling of next period, till all the packet queues to be transmitted are vacant.

Figure 2:
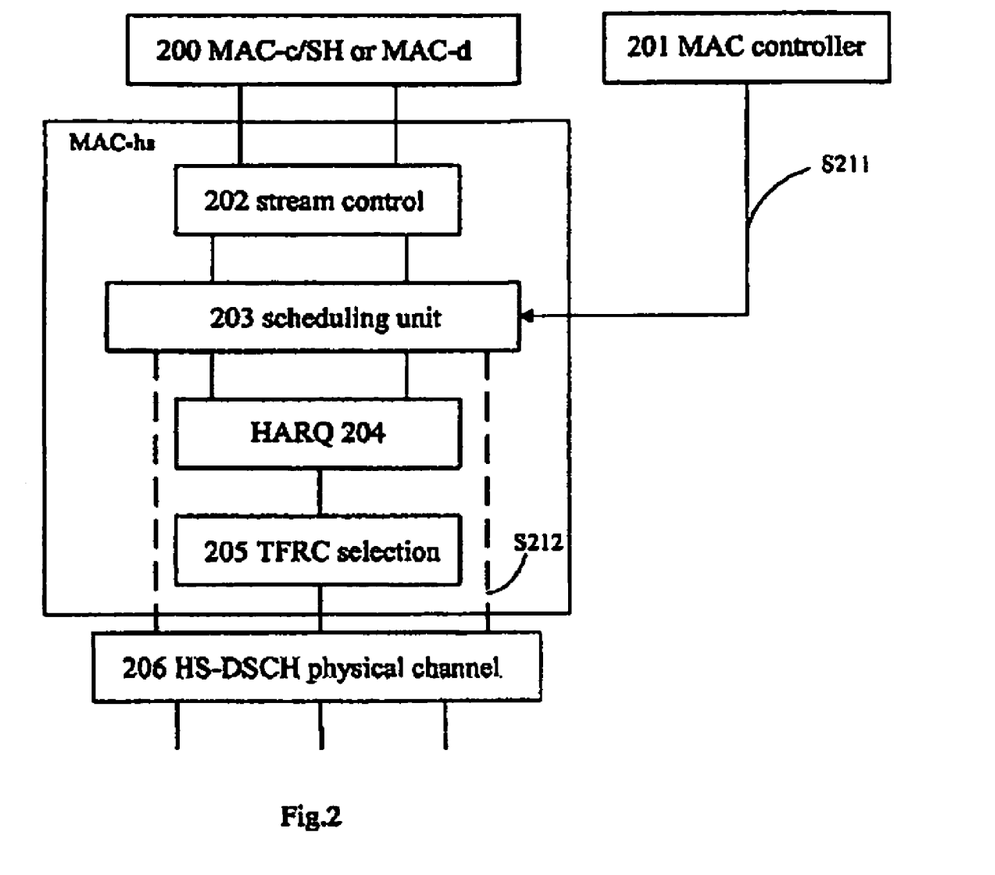
FIG. 2 is the schematic diagram for applying the packet scheduling method of the present invention in HSDPA system of WCDMA.

FIG. 2 is the schematic diagram of applying the packet scheduling method of the present invention in HSDAP system of WCDMA, wherein the real line represents the user data and control information of downlink, the dash line represents the uplink signaling; MAC-c/sh represents the media access control for the control channel and shared channel; MAC-d represents the media access control for the special data channel; MAC-hs represents the media access control for the downlink high speed packet access channel. MAC-hs module comprises a stream control module 202, a scheduling unit 203, a hybrid auto repeat request (HARQ) module 204 and a TCP format rate control (TFRC) module 205. MAC-c/sh or MAC-d module 200 sends the packaged data in the MAC-d protocol data unit to the stream control module 202, which sends the data to the scheduling unit 203 after controlling the optimum throughput between MAC-c/sh or MAC-d module 200 and MAC-hs module.

The scheduling unit 203 buffers the data packet temporarily, calculates the delay waiting time $W_{i,j}$ of each packet, the real time packet loss ratio $PL_{i,j}$ of each user, the time delay jitter of packet $Jitter_{i,j}$, and receives the control information S211 transmitted from MAC controller 201, including the QoS requirements of services, the delay threshold $W_{max,m}$, the time delay jitter threshold $Jitter_{max,n}$, the real time packet loss ratio threshold $PL_{max}$ of each user, the delay occurred before MAC-hs and the overall power limit of all the HS-DSCH. The uplink signaling S212 from High Speed Downlink Shared Channel (simplified as HS-DSCH) 206 includes such channel state information as the maximum number of transmission bits in the transmission time interval TTI, the modulating manners, the code channel number, etc. Then the packet date is scheduled in the scheduling unit 203 according to the scheduling method of the present invention.

After being scheduled, the packet data is transmitted to the HARQ module 204 for performing the hybrid feedback retransmission function, then to the TFRC module 205 for performing the transmission format selection function, and finally is assigned to HS-DSCH 206 to be transmitted in air.

Figure 3:
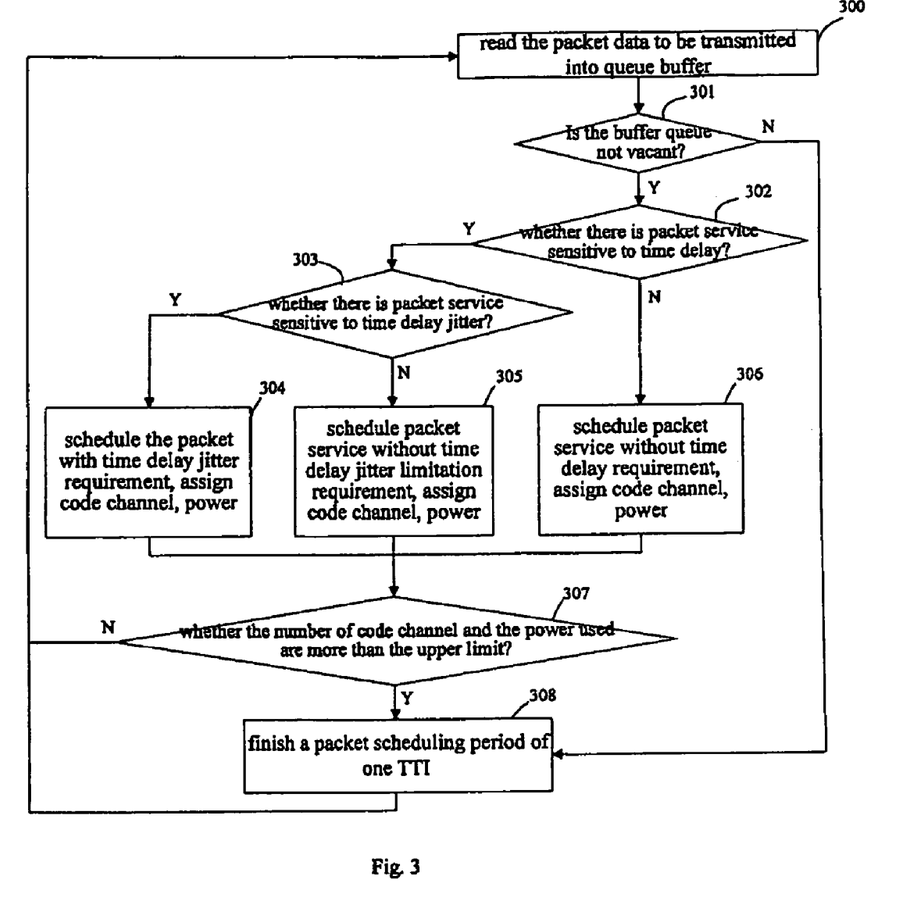
FIG. 3 is the detailed flowchart of scheduling by the scheduling elements in FIG. 2.

FIG. 3 is the concrete flowchart of packet scheduling by scheduling unit 203 of FIG. 2. The scheduling method used in HSDPA system divides the levels of priority among the packet with time delay jitter and time delay limitation, the packet only with time delay limitation, and the packet without time delay limitation. Meanwhile, besides scheduling packet according to the period of transmission time interval TTI in terms of time order, the scheduling method also has to schedule the code channel and power within the same TTI period. First, read the packet data to be transmitted through HS-DSCH 206 into the buffer of queue (step 300), since the data may not be obtained when read, it is necessary to judge whether the buffer queue is vacant (step 301), if is, finish the packet scheduling period of one TTI (step 308), if not, continue to judge whether there is packet service sensitive to time delay (step 302), when there is no such packet service, it indicates that it is packet service without time delay limitation, and perform step 306, when there are packet services sensitive to time delay, then further judge whether there are packet services sensitive to time delay jitter (step 303), if yes, perform step 304, if no, perform step 305. After two judgements of step 302 and step 303, the packet data to be transmitted can be corresponded to packet with time delay jitter and time delay limitation, or packet only with time delay limitation, or packet without time delay limitation, the priority levels of the above three kinds of packet rank from high to low as the packet with time delay jitter and time delay limitation first, the packet only with time delay limitation second, and the packet without time delay limitation third; the higher the priority level of packet service is, the higher the possibility for its data being sent out with fastest speed is. Step 304 is to schedule the packet with time delay jitter and time delay limitation, which can employ the scheduling method of the present invention to assign the code channel and power, with its specific embodiment scheme shown in FIG. 1. Step 305 is to schedule the packet service without time delay jitter but with time delay limitation, which commonly uses the EDF (Earliest Deadline First) algorithm, that is to give priority to servicing the user packet most approximating to the time threshold. Step 306 is to schedule the packet service without time delay limitation whose priority level is lowest, in which, the ordinary wireless WFQ fair scheduling method can be employed. After performing step (304), step (305), step (306) respectively, perform step (307) to judge whether the code channel assigned in this TTI scheduling period or the overall power used exceeds the upper limit, if yes, finish the packet scheduling period of one TTI (step 308), if not, return to step 300 to continue scheduling the packet service in this TTI scheduling period after re-reading new data. After finishing step 308, also return to step 300 to schedule the packet service in the next TTI scheduling period after re-reading new data.

Figure 4:
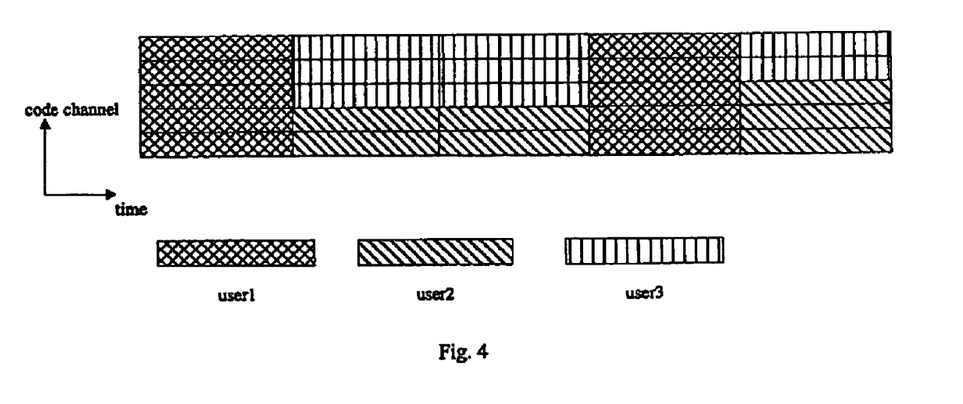
FIG. 4 is the schematic diagram of scheduled results of HSDPA system on code channel and on time.

FIG. 4 is the schematic diagram of the scheduled results of HSDPA system on code channel and on time. Suppose the code channel upper limit is 5 and there are 3 users in system, all the code channels and power are assigned to user 1 in the first TTI; in the second TTI, two code channels are assigned to user 2 and three code channels are assigned to user 3; the scheduled result in the third TTI is same as that of the second TTI; the scheduled result in the forth TTI is same as that of the first TTI; in the fifth TTI, three code channels are assigned to user 2, two code channels are assigned to user 3. From above, it can be illustrated that the scheduling method of HSDPA system is to schedule packet both on code channel and on time.

Lastly, it should be noted that the above embodiments are only to illustrate the technical scheme of the present invention, without any limitation. Although the present invention is described in detail with reference to the preferred embodiments, the ordinary person skilled in the art should understand that the scheme of the present invention can be modified or substituted, without departing from the spirit and scope of the technical schemes of the present invention, all of which should be covered within the following claims.

We claim:

1. A method for scheduling packets in a wireless telecommunication system, comprising:
   dividing user packet queues to be transmitted into user packet queues with packet loss and user packet queues without packet loss;
   for the user packet queues with packet loss, if a real time loss ratio of packets for a user exceeds a predetermined packet loss ratio threshold, terminating a connection to the user;
   if the real time loss ratio of packets for the user does not exceed the predetermined packet loss ratio threshold, scheduling the user packet queues according to a volume of the loss ratio of packets, giving priority to scheduling the user packet queues with high loss ratio of packets; and
   for the user packet queues without packet loss, scheduling according to packet lengths, channel quality states, time delays and time delay jitters.

2. The method of scheduling packets in a wireless telecommunication of claim 1, wherein said step of dividing user packet queues to be transmitted into the user packet queues with packet loss and the user packet queues without packet loss further includes the steps of:
   obtaining related information, required for scheduling, including the channel quality states, the lengths of all packets to be transmitted, maximum delay thresholds for all packets, delay waiting time for all packets, real time loss ratios of packets for all users, real time loss ratio thresholds of packets for all users, time delay jitters for all packets and maximum time delay jitter thresholds for all packets;
   judging whether the real time loss ratio of packets for each of users is more than 0, if yes, categorizing the user packet into the user packet queues with packet loss; if not, categorizing the user packet into the user packet queues without packet loss.

3. The method of scheduling packets in wireless telecommunication system of claim 2, wherein said channel quality state is a reciprocal of a maximum possible transmission rate in a wireless channel.

4. The method of scheduling packets in wireless telecommunication system of claim 2, wherein said channel quality state is a reciprocal of a measured ratio of signal to noise in a channel.

5. The method of scheduling packets in wireless telecommunication system of claim 2, wherein said channel quality state is path loss of transmission.

6. The method of scheduling packets in wireless telecommunication system of claim 1, wherein said scheduling according to the packet length, the channel quality state, the time delay and the time delay jitter is scheduling with priority according to a value of $(W_{max,m}-W_{i,j})(\text{Jitter}_{max,n}-\text{Jitter}_{i,j})l_{i,j}C_{i,j}$, giving priority to scheduling a user packet queue having a least value of $(W_{max,m}-W_{i,j})(\text{Jitter}_{max,n}-\text{Jitter}_{i,j})l_{i,j}C_{i,j}$, wherein $l_{i,j}$ represents the packet length, $C_{i,j}$ represents the channel quality state, $W_{i,j}$ represents a delay waiting time of packets, $\text{Jitter}_{i,j}$ represents the time delay jitter of packets, $\text{Jitter}_{max,n}$ represents a maximum time delay jitter threshold of packets, $W_{max,m}$ represents a maximum delay threshold of service, the above i represents one user index, j represents a scheduling period, a value of j is an integer not less than one, n corresponds to a type of services with limitation of maximum time delay jitter, m corresponds to a type of services with limitation of maximum delay.

7. The method of scheduling packets in wireless telecommunication system of claim 6, wherein said channel quality state is a reciprocal of a maximum possible transmission rate in a wireless channel.

8. The method of scheduling packets in wireless telecommunication system of claim 6, wherein said channel quality state is a reciprocal of a measured ratio of signal to noise in a channel.

9. The method of scheduling packets in wireless telecommunication system of claim 6, wherein said channel quality state is path loss of transmission.

10. The method of scheduling packets in wireless telecommunication system of claim 6, wherein said time delay jitter of packets $\text{Jitter}_{i,j}$ is the following:
    $\text{Jitter}_{i,j}=0$, when $j=1$,
    $\text{Jitter}_{i,j}=\alpha|(W_{i,j}+l_{i,j}C_{i,j})-(W_{i,j-1}+l_{i,j-1}C_{i,j-1})|+(1-\alpha)\text{Jitter}_{i,j-1}$, when $j\in[2,+\infty)$,
    in which, $l_{i,j}$ represents the packet length, $C_{i,j}$ represents the channel quality state, $W_{i,j}$ represents the delay waiting time of packets, the above i represents the user index, j represents a scheduling period, a value of j is an integer not less than one, $\alpha$ is in a range of 0 to 1, that is, $\alpha\in(0,1)$.

11. The method of scheduling packets in wireless telecommunication system of claim 6, wherein said time delay jitter of packets $\text{Jitter}_{i,j}$ is the following:
    $\text{Jitter}_{i,j}=0$, when $j=1$,
    $\text{Jitter}_{i,j}=\alpha|(W_{i,j})-(W_{i,j-1})|+(1-\alpha)\text{Jitter}_{i,j-1}$, when $j\in[2,+\infty)$,
    wherein, $l_{i,j}$ represents the packet length, $C_{i,j}$ represents the channel quality state, $W_{i,j}$ represents the delay waiting time of packets, the above i represents the user index, j represents a scheduling period, a value of j is an integer not less than one, $\alpha$ is in a range of 0 to 1, that is, $\alpha\in(0,1)$.

12. The method of scheduling packets in wireless telecommunication system of claim 1, wherein said scheduling according to the packet length, the channel quality state, the time delay and the time delay jitter is scheduled according to a value of $(\text{Jitter}_{max,n}-\text{Jitter}_{i,j})l_{i,j}C_{i,j}/W_{i,j}$, giving priority to scheduling a user packet queue having a least value of $(W_{max,m}-W_{i,j})(\text{Jitter}_{max,n}-\text{Jitter}_{i,j})l_{i,j}C_{i,j}$, wherein $l_{i,j}$ represents the packet length, $C_{i,j}$ represents the channel quality state, $W_{i,j}$ represents a delay waiting time of packets, $\text{Jitter}_{i,j}$ represents the time delay jitter of packets, $\text{Jitter}_{max,n}$ represents a maximum packet time delay jitter threshold of packets, the above i represents one user index, j represents a scheduling period, a value of j is an integer not less than one, n corresponds to a type of services with limitation of maximum time delay jitter threshold.

13. The method of scheduling packets in wireless telecommunication system of claim 12, wherein said channel quality state is a reciprocal of a maximum possible transmission rate in a wireless channel.

14. The method of scheduling packets in wireless telecommunication system of claim 12, wherein said channel quality state is a reciprocal of a measured ratio of signal to noise in a channel.

15. The method of scheduling packets in wireless telecommunication system of claim 12, wherein said channel quality state is path loss of transmission.

16. The method of scheduling packets in wireless telecommunication system of claim 12, wherein said time delay jitter of packets Jitter$_{i,j}$ is the following:

Jitter$_{i,j}$=0, when j=1,
Jitter$_{i,j}$=α|(W$_{i,j}$+l$_{i,j}$C$_{i,j}$)−(W$_{i,j-1}$+l$_{i,j-1}$C$_{i,j-1}$)|+ (1−α)Jitter$_{i,j-1}$, when j∈[2,+∞), in which, l$_{i,j}$ represents the packet length, C$_{i,j}$ represents the channel quality state, W$_{i,j}$ represents the delay waiting time of packets, the above i represents the user index, j represents a scheduling period, a value of j is an integer not less than one, α is in a range of 0 to 1, that is, α∈(0,1).

17. The method of scheduling packets in wireless telecommunication system of claim 12, wherein said time delay jitter of packets Jitter$_{i,j}$ is the following:

Jitter$_{i,j}$=0, when j=1,
Jitter$_{i,j}$=α|(W$_{i,j}$)−(W$_{i,j-1}$)|+(1−α)Jitter$_{i,j-1}$, when j∈[2,+∞), wherein, l$_{i,j}$ represents the packet length, C$_{i,j}$ represents the channel quality state, W$_{i,j}$ represents the delay waiting time of packets, the above i represents the user index, j represents a scheduling period, a value of j is an integer not less than one, α is in a range of 0 to 1, that is, α∈(0,1).

18. The method of scheduling packets in wireless telecommunication system of claim 1, wherein said channel quality state is a reciprocal of a maximum possible transmission rate in a wireless channel.

19. The method of scheduling packets in wireless telecommunication system of claim 1, wherein said channel quality state is a reciprocal of a measured ratio of signal to noise in a channel.

20. The method of scheduling packets in wireless telecommunication system of claim 1, wherein said channel quality state is path loss of transmission.

21. A method of scheduling packets in wireless telecommunication system, comprising:

reading data of packets to be transmitted into buffers of a queue, and dividing the packets into packets with time delay jitter and time delay limitation, packets only with time delay limitation, and packets without time delay limitation, wherein the packets with time delay jitter and time delay limitation, the packets only with time delay limitation, and the packets without time delay limitation have priority levels from high to low;

for the packets with time delay jitter and time delay limitation, scheduling the data of packets according to the priority levels by using a method for scheduling packets comprising:

dividing user packet queues to be transmitted into user packet queues with packet loss and user packet queues without packet loss;

for the user packet queues with packet loss, if a real time loss ratio of packets for a user exceeds a predetermined packet loss ratio threshold, terminating a connection to the user;

if the real time loss ratio of packets for the user does not exceed the predetermined packet loss ratio threshold, scheduling the user packet queues according to a volume of the loss ratio of packets, giving priority to scheduling the user packet queues with high loss ratio of packets; and for the user packet queues without packet loss, scheduling according to packet lengths, channel quality states, time delays and time delay litters;

then, judging whether a code channel assigned in a scheduling period of a transmission time interval or an overall power used exceeds a predetermined upper limit, if yes, completing the scheduling period of one transmission time interval for the packet, if not, reading new data to be transmitted and continuing scheduling a packet service in the scheduling period of the transmission time interval; and reading new data to be transmitted to start scheduling a packet service in a scheduling period of the following transmission time interval.

22. The method of scheduling packets in wireless telecommunication system of claim 21, wherein said step of dividing the packets further includes steps of:

judging whether there is a packet service sensitive to time delay in the data of packets in the queue;

if it is judged that there is no packet service sensitive to time delay in the data of packets in the queue, indicating that the packet service in the queue is a packet without time delay limitation, the packet without time delay limitation having a lowest priority level;

if it is judged that there is a packet service sensitive to time delay in the data of packets in the queue, further judging whether there is a packet service sensitive to time delay jitter in the packet service sensitive to time delay, if it is judged that there is a packet service sensitive to time delay jitter in the packet service sensitive to time delay, the packet service sensitive to time delay jitter being a packet with time delay jitter and time delay limitation, the packet with time delay jitter and time delay limitation having a highest priority level;

if it is judged that there is no packet service sensitive to time delay jitter in the packet service sensitive to time delay, the packet service sensitive to time delay jitter being a packet only with time delay limitation, the packet only with time delay limitation having a moderate priority level.

23. The method of scheduling packets in wireless telecommunication system of claim 22, wherein the packet with only time delay limitation is scheduled by a method utilizing Earliest Deadline First (EDF) algorithm, that is, a method of selecting a user packet most approximating to the maximum time delay threshold and providing priority services.

24. The method of scheduling packets in wireless telecommunication system of claim 22, wherein the packet without time delay limitation is scheduled by a wireless weight fair queue scheduling method.

25. The method of scheduling packets in wireless telecommunication system of claim 21, wherein the packet with only time delay limitation is scheduled by a method utilizing Earliest Deadline First (EDF) algorithm, that is, a method of selecting a user packet most approximating to the maximum time delay threshold and providing priority services.

26. The method of scheduling packet in wireless telecommunication system of claim 21, wherein the packet without time delay limitation is scheduled by a wireless weight fair queue scheduling method.

* * * * *

UNITED STATES PATENT AND TRADEMARK OFFICE
CERTIFICATE OF CORRECTION

PATENT NO. : 7,630,320 B2  Page 1 of 1
APPLICATION NO. : 10/579131
DATED : December 8, 2009
INVENTOR(S) : Zhang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 786 days.

Signed and Sealed this

Second Day of November, 2010

David J. Kappos
*Director of the United States Patent and Trademark Office*